(No Model.)
J. SWAN.
MECHANISM FOR MANUFACTURING AUGERS.
No. 303,239. Patented Aug. 5, 1884.
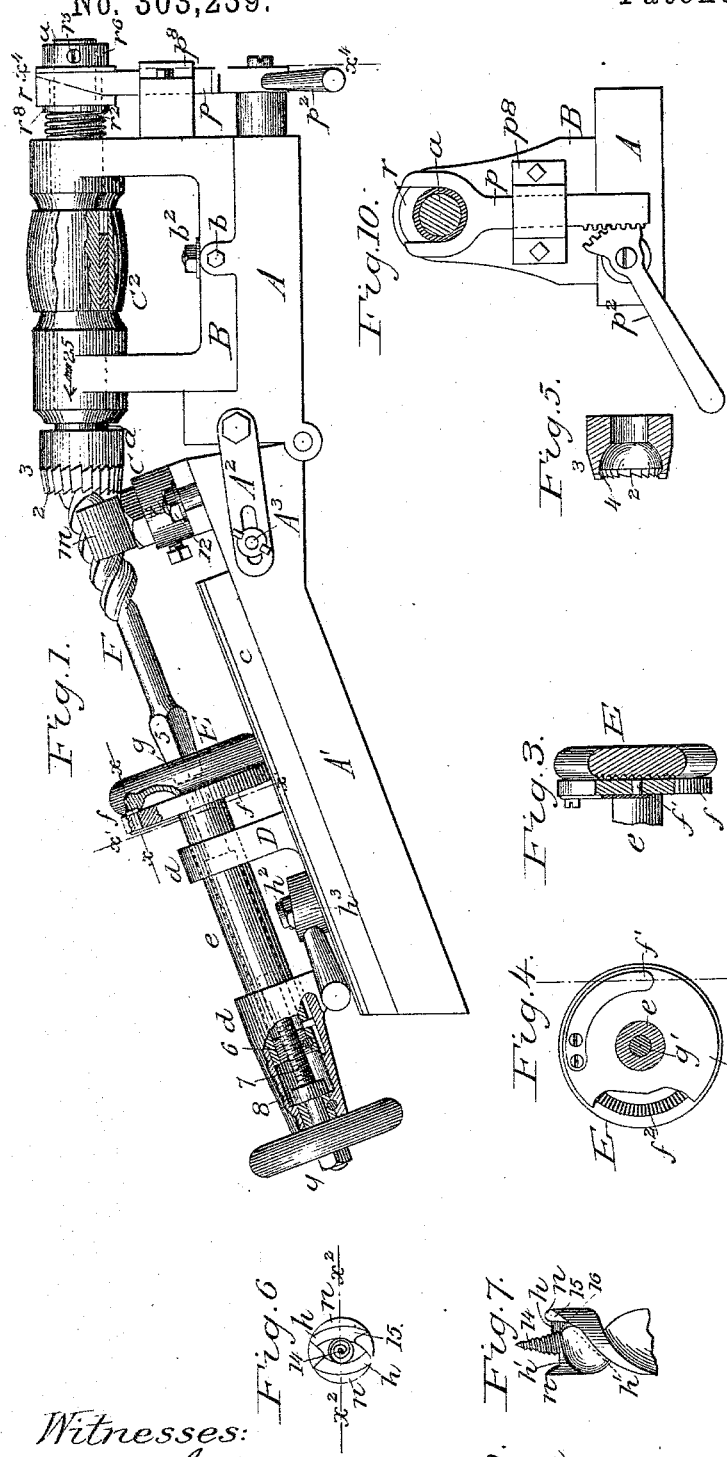
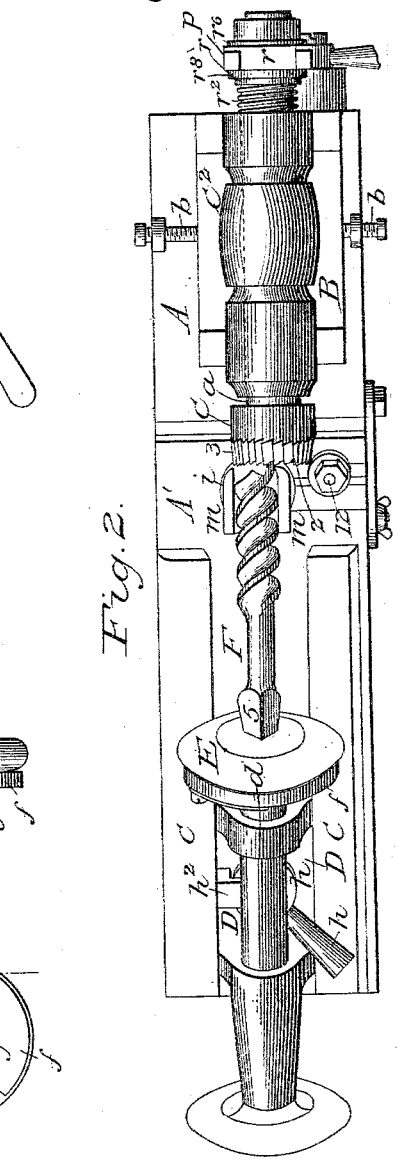
Witnesses:
Aly. Scott
Chas. A. Tiney
Inventor.
James Swan
by Crosby & Gregory,
Attys.

UNITED STATES PATENT OFFICE.

JAMES SWAN, OF SEYMOUR, CONNECTICUT.

MECHANISM FOR MANUFACTURING AUGERS.

SPECIFICATION forming part of Letters Patent No. 303,239, dated August 5, 1884.

Application filed July 8, 1884. (No model.) Patented in England December 26, 1883, No. 5,859.

*To all whom it may concern:*

Be it known that I, JAMES SWAN, of Seymour, county of New Haven, State of Connecticut, have invented an Improvement in Mechanism for Manufacturing Augers, of which the following description, in connection with the accompanying drawings, is a specification—like letters on the drawings representing like parts.

My invention has for its object the production of a machine by which to automatically mill and bevel truly the floor-lip and cutting-spurs of auger-bits. Heretofore this work has been done by several cutting-disks, one being used after the other, and the portions of the bit acted upon by the said cutters have then always been finished with a file, for the surface left by the cutters is neither sufficiently true nor smooth, for the bit has always been held by hand during such operations. By my invention these several handlings of the bit and its treatment with several tools and then with files are obviated, and the floor-lip and cutting-spurs are finished truly and smoothly at one operation by a single tool, the bit being held by a suitable holder or rest. In accordance with my invention, the bit is first roughly formed, by forging or otherwise, to outline the point for the leading-screw and portions for the floor-lip and spurs, and the pod is formed as now commonly practiced in the manufacture of spur-bits, and the bit is then annealed and straightened, and the point for the leading-screw is milled true to its base, and the outside of the cutting-spurs are turned or milled true, all as usual. In this condition the shank of the bit is placed in a holder or chuck, and the pod at or near the other end of the bit is placed in or on a suitable rest, so that a cylindrical milling-tool—such as will be hereinafter described—may act to cut the floor-lip at an incline, the tool being so shaped and the devices for holding and supporting the bit being so placed with relation to the center of the milling-tool that the floor-lip is cut at the proper incline, or is given, as it is termed, the proper "fall or clear," or so that the floor-lip does not bear on the solid wood back of its cutting-edge. The milling-tool employed is cylindrical, and has milling-teeth at its annular end and also at its outer side, which teeth are preferably beveled to act upon and cut the inner face of the spur at an inclination to the floor-lip; and this tool is also so shaped at its interior and just at its end as to enable it to cut laterally into the face of the point to be threaded for the leading-screw, so as to enable the cutting-edge of the floor-lip to meet the said point and form a part of one of the screw-threads which is to be subsequently formed thereon. As the bit is advanced on the milling-tool or vice versa, the latter, besides beveling the floor-lip, also bevels the cutting-spur from its edge toward the floor-lip; and it will be also noticed that the inner wall of the said spur will be left concave and circular, whereas in all other similar bits wherein the spur is finished with a file, as usual, the inner side of the spur is straight or convexed. Having finished the floor-lip and spur at one side of the point, the bit will be turned one-half around and the other floor-lip and spur will be treated in like manner. After this the point will be threaded to form the leading-screw, and the bit will be finished as usual, thus doing away with a file with which to give shape to the floor-lip and spurs.

Figure 1, in side elevation, partially broken out, shows a machine for the manufacture of spur-bits in accordance with my invention; Fig. 2, a top view thereof; Fig. 3, a section of the chuck and part of the spindle and locking device for the chuck on the dotted line $x$ $x$. Fig. 4 is a section on the dotted line $x'$ $x'$, Fig. 1, partially broken out. Fig. 5 is a section of the cutting-tool detached. Fig. 6 is an end view of the head of a finished spur-bit; Fig. 7, a side elevation of the head of the bit; Fig. 8, a similar view with the bit rotated one-fourth around. Fig. 9 is a section of Fig. 6 on the line $x^2$ $x^2$, and Fig. 10 a section of Fig. 1 on dotted line $x^4$.

Referring to the drawings, which represent one form of apparatus by which my invention may be practiced, A A' designate the two parts of the bed of the machine, the said parts being arranged in different planes, so that the bit being milled may be held at an angle with relation to the center of motion of the milling-tool, to thus give the proper clear or incline to the floor-lip and to place that part of the bit being treated in proper contact with the tool. As herein shown, these two parts A A' are hinged together or pivoted, the one with relation to the other, so that one may be more or less inclined with relation to the other, according to the inclination desired for the floor-lip, there being suitable adjusting devices, A², and set-screws A³, to confine the said parts in adjusted position. The part A serves as a support for the head B, having suitable bearings for the shaft or arbor $a$, (shown in dotted lines, Fig. 2,) upon the end of which is secured the milling or cutting tool C, the said shaft having upon it a suitable belt-pulley, C², the head being slotted and made adjustable by suitable adjusting devices, $b$ $b^2$, shown in Figs. 1 and 2 as screws.

The tool C, as herein shown, is made as part of a cylinder, and has a series of teeth, 2, at its outer annular end, and is beveled at its exterior, near its outer end, and is provided with a series of teeth, 3, and just within its outer end the said tool is provided with a cutting-rim, 4.

The portion A' of the frame has guideways $c$ $c$ to receive the carriage D, which has suitable bearings, $d$, to support the spindle $e$, upon which is a face, disk, or arm, $f$, provided, as herein shown, with a pawl, $f'$, to engage ratchet teeth or recesses $f^2$, made at the inner side of a chuck or holder, E, having a central aperture, $g$, (see dotted lines, Fig. 1,) to receive and hold the squared end 5 of the shank of the bit F, the said chuck or holder having a pintle, $g'$, Fig. 4, to enter a recess in the end of the spindle $e$. This pawl and ratchet enables the chuck or holder to be turned more or less to accommodate the floor-lip and spur of the bit to the milling-tool C, notwithstanding variations in position of the corners of the squared ends of the bits with relation to the edge of the floor-lip, such variations occurring by slight differences in the amount of twist put into the pod. Instead of a pawl and ratchet, I might use a set-screw or other holding device, and I shall therefore denominate the said pawl and ratchet, or its described equivalent, as the "chuck-retaining device." The carriage D will have a suitable eccentric clamp, $h^3$, to lift a wedge, $h^2$, by which to secure said carriage in adjusted position in the guideways. The spindle $e$ has a nut, 6, which receives a screw, 7, provided with a suitable collar, 8, which permits the screw to be rotated in the bearing $d$ by the hand-wheel 9, but prevents the said screw from being moved longitudinally. So by turning the said screw the spindle and chuck may be advanced at the proper speed, according to the speed at which it is desired to cut the floor-lip and spur. The portion A' also has adjustably connected with it, by bolt 12, a socket, $i$, which receives the round stem or shank of the rest $m$, which is shown as a concaved block, the said shank being adjustably held to enable the head of the bit to be placed in exactly the proper position for the tool to act properly upon it.

Referring to Fig. 7, it will be seen that the floor-lip $h$ is inclined backward from its cutting-edge $h'$, and this inclination may be varied more or less by the relative differences between the levels of the parts A A' of the frame. The shape of the inner wall of the cutting-lip $n$ will depend upon the shape of the cylindrical tool, and will be more or less beveled, according to the bevel of the said tool, and the tool being circular externally, it is obvious that the inner wall, 15, of the spur $n$, next the point 14, to be made into a leading screw, (see Fig. 6,) will be left concave and circular, rather than straight or convexed, one or the other of which conditions has always heretofore existed, as this part of bits has been universally finished by filing.

The bit produced by my improved machine herein described forms the subject-matter of United States Patent No. 290,812, dated December 25, 1883.

When the floor-lip and spur have been cut to the proper depth, the rim 4 is made to cut into the base of the point 14, to form a groove, 16, which constitutes a part of the last thread at the base of the leading-screw, the part of the said thread which is formed by the said rim being practically a continuation of the cutting-edge of the floor-lip. This may be done by changing the relative positions laterally of the tool and bit, and by moving either the rest or the head.

Instead of moving the spindle, chuck, and bit longitudinally by the screw and nut described, the shaft $a$ may be moved longitudinally, as the cutter forms the floor-lip and the inner face of the cutting-lip, and to do this I have provided the following means.

The belt-pulley C² is connected with the shaft $a$ by a spline, so that the said shaft may be moved longitudinally in its bearings, and with relation to the pulley C², by means of the advancing mechanism, which, as herein shown, is composed of a forked beveled-face slide-bar, $p$, which enters an annular groove in a collar, $r$, loose on the shaft $a$, one side of the wall of the said groove being straight or annular, while the other wall is beveled to correspond with the bevel at the rear side of the slide. The shaft $a$ has fastened upon it, by the screw $r^5$, the collar $r^6$, against which collar one end of the loose collar $r$ rests.

A spring, $r^2$, is arranged on the shaft $a$, between the bearing for the shaft and the collar $r^3$, fast on the shaft $a$, and forming an abutment for collar $r$, so that the tendency of the spring, when not compressed by the action of the slide-bar $p$, is to force the collar $r$ against the collar $r^6$ and draw the cutter and shaft back from the end of the bit. The toothed slide-bar $p$ is held in the guide $p^3$, and its upward movement by the toothed sector-lever $p^2$ moves the loose collar $r$ toward the shaft-bearing, and causes the inner end of the said collar to act against the collar $r^8$, and move the shaft $a$, with its attached cutting-tool C, forward in the direction of the arrow 25, causing the said tool to gradually cut the floor-lip of the bit.

I have herein described a metal cutting-tool having a cylindrical body and provided with an annular cutting-end, and with a cylindrical cutting-periphery; and so, also, I have shown the said tool as provided with an internal cutting-rim, 4, but I do not herein claim such tool, as it forms the subject-matter of independent claims in my application No. 108,321, filed October 6, 1883, to which reference may be had.

I claim—

1. The rotating cylindrical tool having an annular cutting-edge, combined with a rest and chuck or holder for the opposite ends of the bit, the said rest and chuck having their center lines out of line with relation to the center of rotation of the said tool, to enable the floor-lip to be cut at an inclination, substantially as described.

2. The portion A of the frame-work, the head, and cylindrical rotating milling-tool supported by the said head, and the portion A' of the frame-work, and the carriage and chuck or holder mounted on it, combined with a rest for the end of the bit to hold the same in fixed position as the milling-tool cuts the floor-lip and spur of the bit, and with means to enable the relative positions of the said bit and milling-tool to be changed longitudinally with relation to each other as the floor-lip and spur are being formed and reduced, substantially as described.

3. In a milling-machine, a carriage, D, the spindle thereon, and the chuck or holder adjustably connected to said spindle and adapted to receive and hold an auger or bit to be treated, combined with a pawl and ratchet or equivalent device to retain the chuck in position to properly present the auger or bit to the milling-tool, substantially as and for the purpose described.

4. The chuck to receive and hold the shank end of the bit, and the rest to hold the end of the bit next the milling-tool, combined with a hollow cylindrical milling-tool provided with a cutting-surface, 3, at its outer periphery back of its end, the said surface 3 acting to form the inner end of the spur of the bit, substantially as described.

5. A chuck to receive and hold the shank of a bit, and a rest to hold the cutting-end of the bit near a cylindrical milling-tool, combined with a hollow cylindrical milling-tool having a cutting-surface, 2, at its extremity and a cutting-surface, 3, at its outer side and back of the said cutting-surface 2, the said surfaces 2 and 3 acting simultaneously to form and to incline both the floor-lip and inner side of the spur of the said bit, substantially as described.

6. A rest and chuck for the opposite ends of the bit, combined with a rotating cylindrical tool having a cutting-rim, 4, to form a groove or partial thread at the base of the point or leading-screw, substantially as described.

7. A rest and chuck for the opposite ends of the bit, combined with a rotating cylindrical tool having a cutting-rim, 4, a cutting annular end, 2, and a beveled cutting-periphery, 3, back of said end, to operate substantially as described.

8. An organized mechanism for cutting the floor-lip and spur of an auger or bit, the same consisting, essentially, of an adjustable work-holder and a rotary annular milling-tool having cutting-edges to cut the floor-lip at a proper incline or fall and cut and bevel the spur, substantially as set forth.

9. In a machine for manufacturing augers or bits, an annular rotary tool having the cutting-edge 2, axial peripheral cutting-edge 3, and inner cutting-rim, 4, combined with a work-holder arranged to present the work eccentrically to said tool, substantially as set forth.

In testimony whereof I have signed my name to this specification in the presence of two subscribing witnesses.

JAMES SWAN.

Witnesses:
 G. W. GREGORY,
 B. J. NOYES.